(12) United States Patent
Spiegelhalder et al.

(10) Patent No.: US 9,691,512 B2
(45) Date of Patent: Jun. 27, 2017

(54) CHOPPER DISC AS WELL AS DEVICE AND METHOD FOR MANUFACTURING SAME

(71) Applicant: Airbus DS GmbH, Taufkirchen (DE)

(72) Inventors: Berno Spiegelhalder, Constance (DE); Uwe Keller, Ueberlingen (DE); Ernst Kaeppeler, Langenargen (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/676,052

(22) Filed: Apr. 1, 2015

(65) Prior Publication Data
US 2015/0287490 A1    Oct. 8, 2015

(30) Foreign Application Priority Data

Apr. 2, 2014 (DE) .................. 10 2014 004 994

(51) Int. Cl.
| | |
|---|---|
| *G21K 1/04* | (2006.01) |
| *G21K 1/10* | (2006.01) |
| *B29C 70/42* | (2006.01) |
| *B29C 70/54* | (2006.01) |
| *B29C 70/46* | (2006.01) |
| *B29C 67/00* | (2017.01) |

(Continued)

(52) U.S. Cl.
CPC .............. *G21K 1/10* (2013.01); *B29C 53/564* (2013.01); *B29C 53/821* (2013.01); *B29C 67/0059* (2013.01); *B29C 70/42* (2013.01); *B29C 70/46* (2013.01); *B29C 70/545* (2013.01); *G21K 1/04* (2013.01); *G21K 1/043* (2013.01); *B29L 2031/7728* (2013.01)

(58) Field of Classification Search
None
See application file for complete search history.

(56) References Cited

U.S. PATENT DOCUMENTS 4,114,962 A * 9/1978 Konig ..................... B29C 53/56
                                                            156/172
4,354,804 A * 10/1982 Cruzen ................... F01D 5/282
                                                            416/230

(Continued)

FOREIGN PATENT DOCUMENTS

| DE | 25 45 929 B1 | 9/1976 |
|---|---|---|
| DE | 195 03 939 C1 | 6/1996 |

(Continued)

OTHER PUBLICATIONS

Antonelli et al., "The Design of a CRFP Chopper Disc for a Time of Flight Spectrometer", 18th International Conference on Composite Materials, 2011.*

(Continued)

*Primary Examiner* — Michael Logie
(74) *Attorney, Agent, or Firm* — Crowell & Moring LLP

(57) ABSTRACT

A chopper disc for a device for the processing of neutron beams is made of carbon fibers and has a concentric, hollow cylindrical recess for receiving a hub for connection to a pivot bearing. The chopper disc also includes a concentric absorber area for absorbing neutrons striking the chopper disc and at least one window in the absorber area through which neutrons of the neutron beam can pass. The carbon fibers extend from the outer periphery of the chopper disc radially in the direction of the recess and contact the recess tangentially.

14 Claims, 5 Drawing Sheets

Figure 3:
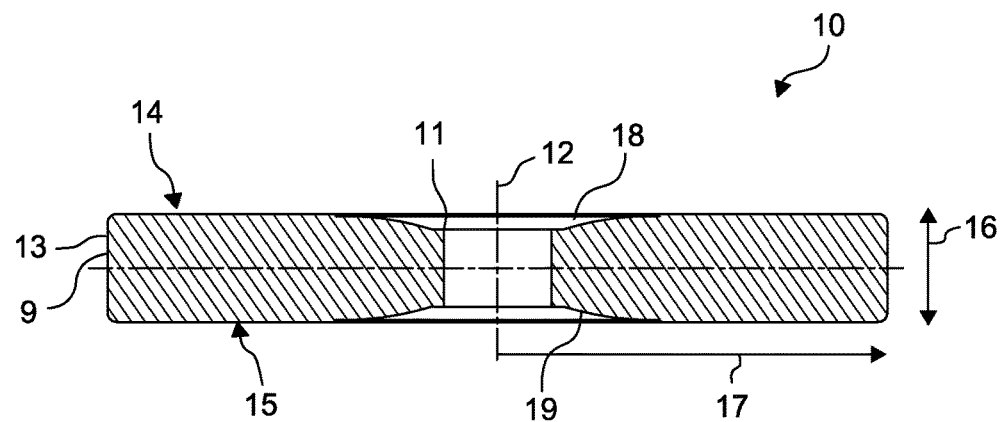

(51) Int. Cl.
  *B29C 53/56* (2006.01)
  *B29C 53/82* (2006.01)
  *B29L 31/00* (2006.01)

(56) References Cited

U.S. PATENT DOCUMENTS 4,629,644 A * 12/1986 Matuska ............... B29C 53/564
                                                          416/134 A
2012/0151791 A1 * 6/2012 Atkins .................... F16F 15/30
                                                              34/312

FOREIGN PATENT DOCUMENTS

DE    199 06 618 A1    8/2000
JP    2005-300487 A    10/2005
SU    1208367 A  *    8/1983   ............. F16D 69/00

OTHER PUBLICATIONS

European Search Report issued in counterpart European Application No. 15000813.4-1556 dated Aug. 25, 2015, with Statement of Relevancy (Eight (8) pages).

* cited by examiner

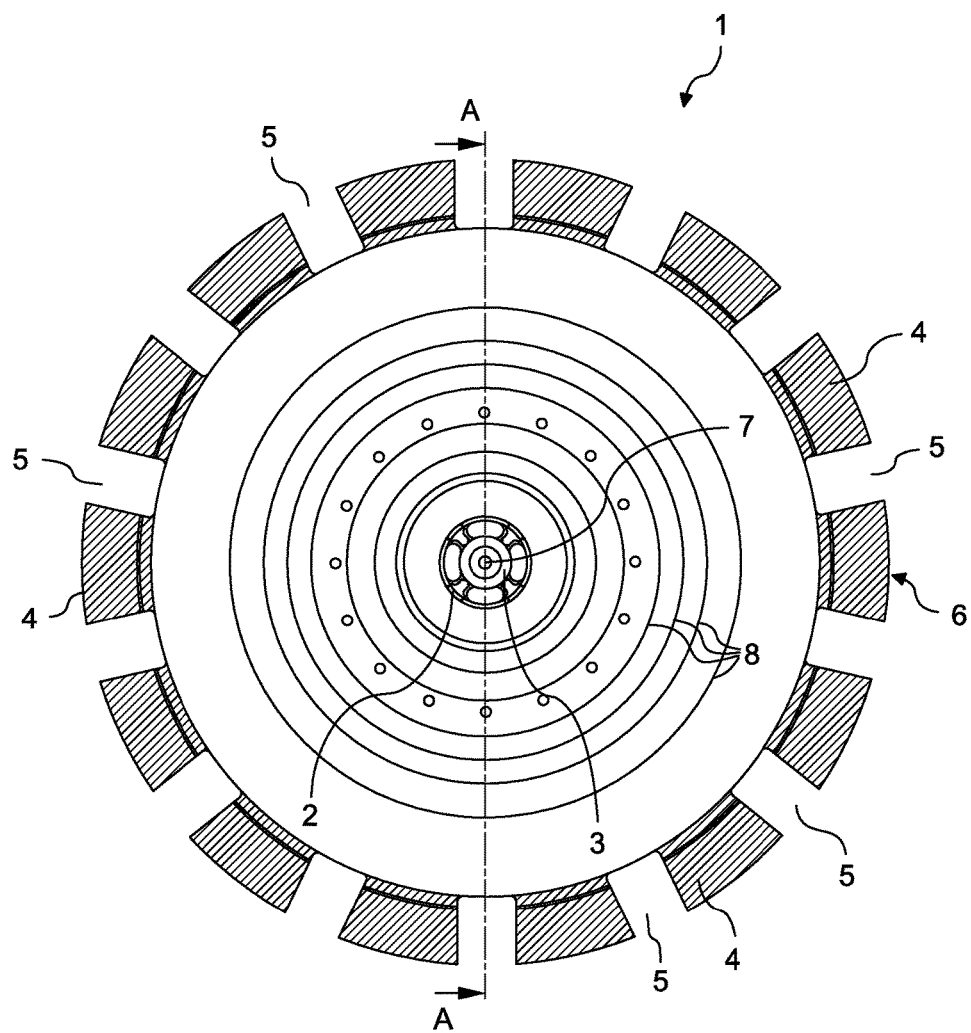
Fig. 1
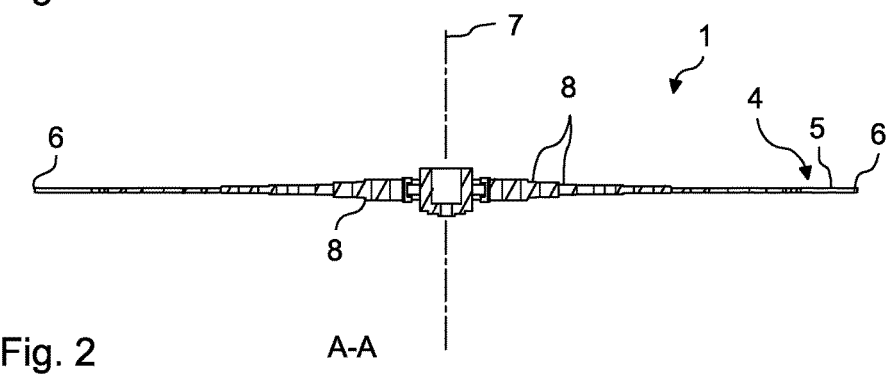
Fig. 2  A-A

CHOPPER DISC AS WELL AS DEVICE AND METHOD FOR MANUFACTURING SAME

CROSS-REFERENCE TO RELATED APPLICATIONS

The present application claims priority under 35 U.S.C. §119 to German patent application 10 2014 004 994.9, filed Apr. 2, 2014, the entire disclosure of which is herein expressly incorporated by reference.

BACKGROUND AND SUMMARY OF THE INVENTION

Exemplary embodiments of the present relate to a chopper disc for a device for the processing of neutron beams, the chopper disc being made of carbon fibers. Such a chopper disc has a concentric, hollow cylindrical recess for receiving a hub for connection to a pivot bearing. To absorb neutrons striking the chopper disc, a concentric absorber area is provided. At least one window is provided in the absorber area through which neutrons of the neutron beam can pass.

So-called choppers are used for the processing of neutron beams, which—similarly to X-rays—are used for the translumination and analysis of material specimens. Rotating choppers or chopper discs break a continuous neutron beam down into temporally and spatially limited pulses. The number of pulses and the pulse duration can be established by the number and structure of the windows provided in the absorber area. Neutron pulses of a defined energy form ("color") can be filtered out by cascading synchronously rotating chopper discs.

It is desirable for the operation of the device for the processing of neutron beams to be able to operate the chopper disc at speeds that are as high as possible. Contactless magnetic bearings are therefore used as pivot bearings that enable speeds of greater than 20,000 revolutions per minute without lubricant under continuous operation and maintenance-free in the radiation field.

For stability-related reasons, chopper discs of carbon fibers are used beginning at a speed of about 15,000 revolutions per minute. As the speed increases, the need arises to increase the strength of the chopper discs more and more. However, the integration of a greater number of carbon fibers for the purpose of increased strength increases the weight of the chopper disc, which runs contrary to greater rotary speed.

Chopper discs of carbon fibers are manufactured from prepared, trimmed fiber mats. The carbon fibers run parallel to each other in each fiber mat. The carbon fibers are pre-saturated or subsequently impregnated with a plastic resin. To manufacture a chopper disc, several of the fiber mats, generally at least four layers, are placed one over the other, the carbon fibers of each layer being rotated with respect to the preceding layer by a prescribed angle. In general, several packages of four layers each are used to enable the forces occurring at the abovementioned high speeds to be absorbed.

One drawback of chopper discs manufactured in this way is that, due to the plurality of carbon fibers, they are relatively heavy, which limits the maximum speed. What is more, due to the rotational forces (centrifugal force) occurring during rotation, it is always only a portion of the carbon fibers that contributes to the strength.

Exemplary embodiments of the present invention are directed to a structurally and/or functionally improved chopper disc allowing use at higher rotational speeds. Exemplary embodiments of the invention are also directed to a device and a method for the manufacture of such a chopper disc.

According to a first aspect of the present invention, a chopper disc for a device for the processing of neutron beams involves chopper disc made of carbon fibers. The chopper disc has a concentric, hollow cylindrical recess for receiving a hub for connection to a pivot bearing. A concentric absorber area is provided in order to absorb neutrons striking the chopper disc. For example, the absorber area can be provided in the form of a ring in a section of the chopper disc that is arranged radially on the outside. At least one window is provided in the absorber area through which neutrons of the neutron beam can pass. The number and structure of the windows is selected according to the needs of the device for the processing of neutron beams. According to the invention, the carbon fibers extend from the outer periphery of the chopper disc nearly radially in the direction of the recess and contact the recess tangentially.

The carbon fibers thus run substantially radially in relation to an axis of rotation of the chopper disc. This optimized fiber layer results in both the greater strength and reduced weight of the chopper disc. Another advantage is that, as a result of the proposed type of arrangement of the carbon fibers, chopper discs of nearly the same strength can be made available in which the ratio of disc thickness to occurring stresses is optimized. As a result, such a chopper disc can be operated at greater rotational speeds.

More precisely, each of the carbon fibers of the chopper disc is composed of two straight sections and a circular arc section. The straight sections contact the recess tangentially with the end that faces toward the recess. The circular arc running between the two straight sections section corresponds in its profile substantially to the edge or the periphery of the recess of the chopper disc.

Expediently, at least a large portion of the carbon fibers extends from the outer periphery of the chopper disc radially in the direction of the recess and contacts the recess tangentially. In another specific embodiment, all of the carbon fibers extend from the outer periphery of the chopper disc nearly radially in the direction of the recess and contact the recess tangentially. This results in the desired optimized fiber layer, which provides greater strength with reduced weight.

In one embodiment, each first and each second end of the carbon fibers ends at the outer periphery of the chopper disc. A section running in the middle between the respective first and second end describes a circular arc whose profile corresponds substantially to the edge or periphery of the recess. Each of the carbon fibers therefore has three sections: a first straight section, a second straight section and an arched section, which connects the first and the second sections to one another. For example, the (external) angle enclosed between the first straight section and the second straight section is between 180° and 270°. A high level of stability can be ensured in this way. At the same time, it is ensured that an accumulation of material in the area of the recess, i.e., of the hub arranged there later and of the mutually crossing carbon fibers remains in the inner area. As a result, the areas lying radially on the outside remain protected from excessive forces at the desired high speeds. The ideal angle between the straight sections and hence the profile (or circumferential angle) of the arched section depends on the number of carbon fibers integrated into an inventive chopper disc and, particularly, of superposed carbon fiber layers. The ideal angle can be determined in an optimization process or through experimentation.

In relation to a tangent contacting the periphery of the chopper disc, each first and second end (or the first and second straight section) contacts the tangent associated with it approximately tangentially. The crossing of the first and second end (or the first and second straight section) and the associated tangent is merely approximately orthogonal because, due to the presence of the recess for receiving the hub, the carbon fibers cannot run through the center, i.e., the axis of rotation, of the chopper disc. In order to come as close as possible to the ideal radial profile, the straight sections of the carbon fibers contact the periphery of the recess tangentially.

Each of the carbon fibers can have no, one, two or more points of intersection with other carbon fibers. This depends on whether the straight sections of an associated carbon fiber each have the same or a different (external) angle in relation to another carbon fiber.

In a cross-section on a plane on which an axis of rotation of the chopper disc lies, the thickness of the chopper disc decreases continuously starting from the axis of rotation in the direction of the outer periphery. Because the chopper disc does not have any steps, a high level of strength can be achieved compared to chopper discs made of fiber mats, and with reduced weight. It is particularly expedient in this context if the chopper disc has a convex arch on each side in cross-section at least in part. The cross-sectional shape or the profile of the cross-section of the chopper disc is created not only by the process of laying the individual carbon fibers, but also particularly by pressing with a pressing tool. The shape of the chopper disc and the profile of the outer surfaces follow the shapes of the pressing tool. Consequently, the pressing tool has concave indentations in order to achieve the convex arch.

The carbon fibers are expediently embedded into a resin system or enclosed by the resin system. An example of a resin system that can be used is HEXION L20 with a hardener, e.g., EPH 960. As will become clear from the method described below for the manufacture of the chopper disc, the carbon fibers can already be saturated in resin before "laying" or be infiltrated with resin after laying.

In one specific embodiment, the diameter of the chopper disc is between 50 cm and 80 cm. The diameter of the hub can be from 50 mm to 100 mm. The fiber volume content can be between 50% and 70%.

The at least one window can be provided in a section bordering the outer periphery of the chopper disc. The window or windows can be introduced into the chopper disc using a milling or cutting process after manufacture thereof.

According to a second aspect of the present invention, a winding mandrel is proposed for the manufacture of a chopper disc as described above. The winding mandrel comprises a cylinder whose axial length is very much smaller than the radius. The radius cylinder is somewhat larger than the diameter required for the chopper disc to be manufactured. For example, the axial length can be smaller by a factor of ten. The winding mandrel further comprises two dome top caps arranged on the opposing end of the cylinder, each having an inwardly oriented concave indentation. The cylinder and the two dome top caps can be integrally formed. As a result of the respectively inwardly oriented concave indentation of the two dome top caps, the axial length of the cylindrical winding mandrel is shorter in the area of an axis of rotation than in the area of the outer periphery. Finally, the winding mandrel comprises a concentric recess passing through the cylinder and the dome top caps in the axial direction of the winding mandrel through which a shaft for receiving a particularly divided shaft passes for connection to a drive.

The winding mandrel is a component of a device for the manufacture of the chopper disc and makes it possible, unlike when prepared, trimmed fiber mats are used, to wind an endless carbon fiber onto the winding mandrel in order to simultaneously obtain two of the chopper discs as described above. In particular, the use of a winding mandrel and the winding method associated therewith makes it possible to produce chopper discs whose thickness decreases continuously and thus without steps starting from the axis of rotation in the direction of the outer periphery. As a result, chopper discs having nearly the same strength and with an optimum ratio of disc thickness to stress can be wound.

In one embodiment of the winding mandrel, a needle crown or a slip-resistant surface is provided on the outer periphery of the cylinder. This makes it possible to place a carbon fiber laid on a first of the dome top caps over the cylindrical winding mandrel on the other of the two dome top caps. This ensures that the carbon fiber cannot slip in the radial direction. The slip-resistant surface can also be provided, for example, by means of an appropriate material, e.g., a runner or a porous surface.

As mentioned, the winding mandrel has a diameter that is somewhat larger than the diameter of the chopper disc to be achieved. According to one particular embodiment of the winding mandrel, the diameter is between 55 cm and 90 cm. The axial length is between 5 cm and 20 cm, for example.

According to a third aspect of the invention, a device is provided for the manufacture of a chopper disc of the type described above. The device comprises a winding mandrel as described above. The device further comprises a shaft that is guided through the recess of the winding mandrel and is connected in a positive and/or nonpositive manner to the winding mandrel. A drive is provided in order to enable the shaft to be caused to rotate. Furthermore, the device comprises a carbon fiber feeding device that can be moved relative to the winding mandrel and is embodied so as to deliver an endless carbon fiber. Finally, the device comprises a control device that controls the speed and angle of rotation of the winding mandrel relative to the movement of the carbon fiber feeding device in a predefined manner in order to wind the endless carbon fiber around the winding mandrel.

Through the interplay of the named components, it is possible to wind an endless carbon fiber around the winding mandrel. Two of the above-described chopper discs with their advantageous characteristics are thus produced in a first preliminary stage.

In order to enable the winding to be reliably performed in the manner described above, it is expedient if the shaft has a cone shape that expands away from the shaft on both sides of the winding mandrel. This ensures that the large number of carbon fibers guided around the recess of the winding mandrel or around the shaft are pressed in the direction of the winding mandrel and cannot slip loosely into an undefined position.

According to another embodiment, a unit for saturating the endless carbon fiber with a resin system is provided to wet or soak the carbon fiber with the resin system before the winding process. Alternatively, the wetting or soaking of the carbon fibers can also be done after the winding of the winding mandrel.

According to another embodiment, the device comprises two pressing discs, each of which has a concave arch corresponding to the concave arch of the winding mandrel and a diameter corresponding to the winding mandrel in order to be pushed after the winding process from the opposing sides of the winding mandrel onto the shaft and braced with each other. The pressing discs are used to perform a pressing of the endless carbon fiber wound around the winding mandrel in order to eliminate possible gaps occurring during winding and to ensure a symmetrical shape of the chopper disc. This is ensured by the corresponding sheath shapes of the dome top caps of the winding mandrel and of the two pressing discs.

The pressing is preferably done in an autoclave, in which the curing of the arrangement braced with the pressing discs also occurs in a vacuum atmosphere.

According to a fourth aspect of the present invention, a method is provided for the manufacture of a chopper disc as described above using the device described above. The method comprises the following steps:

a) Winding the carbon fiber delivered endlessly from the carbon fiber feeding device according to a predetermined deposition plan around the winding mandrel, the carbon fiber being guided during each winding step tangentially on the shaft and over the needle crown or the slip-resistant surface in order to produce a chopper disc on both sides of the winding mandrel:

b) pressing the carbon fiber by pushing a respective pressing disc onto the shaft on the opposing sides of the winding mandrel;

c) severing the carbon fiber in the area of the periphery of the winding mandrel in order to obtain two chopper discs, each of which was produced between the winding mandrel and the associated pressing disc, the severing being performed during pressing;

d) curing the still-pressed carbon fiber in an autoclave in a vacuum according to a predefined time, pressure and temperature profile;

e) removing the pressing discs;

f) producing the outer contour and of the at least one window in each of the chopper discs.

According to another embodiment of the method, the manufacture of the edge and of the at least one window is performed by water jet cutting or milling.

The carbon fibers can be saturated with the resin system by or in the carbon fiber feeding device. Alternatively or in addition, the resin system can be introduced into the carbon fiber roving after the winding process. It is preferably introduced before the pressing process.

BRIEF DESCRIPTION OF THE DRAWING FIGURES

The invention is explained below in further detail on the basis of an exemplary embodiment in the drawing.

Figure 4:
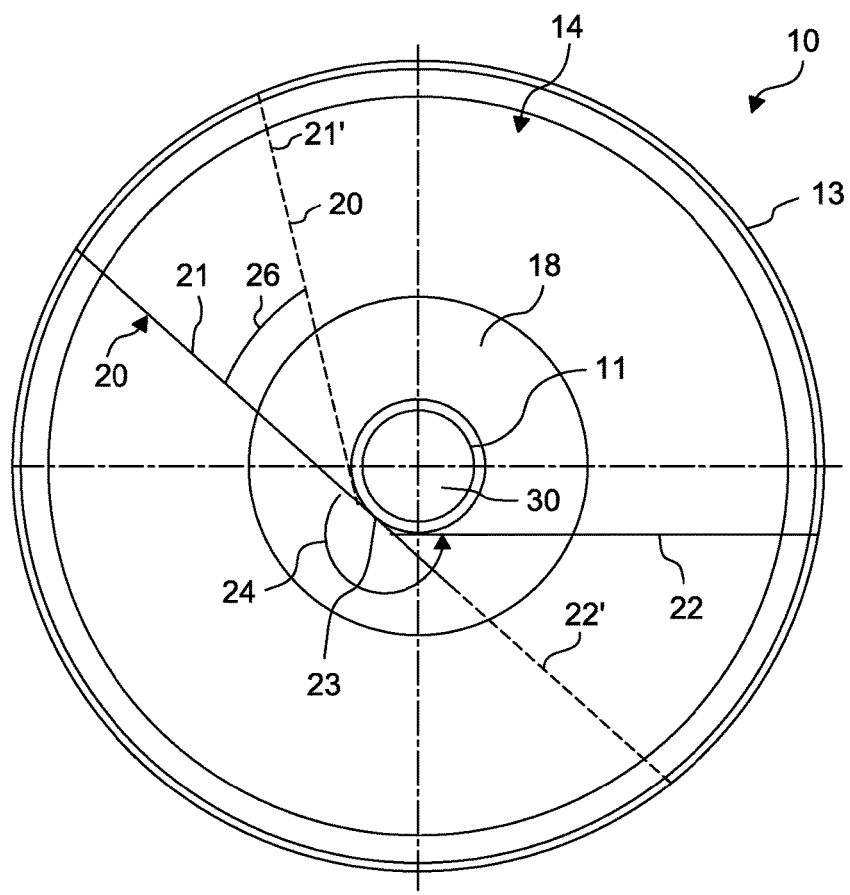
Figure 5:
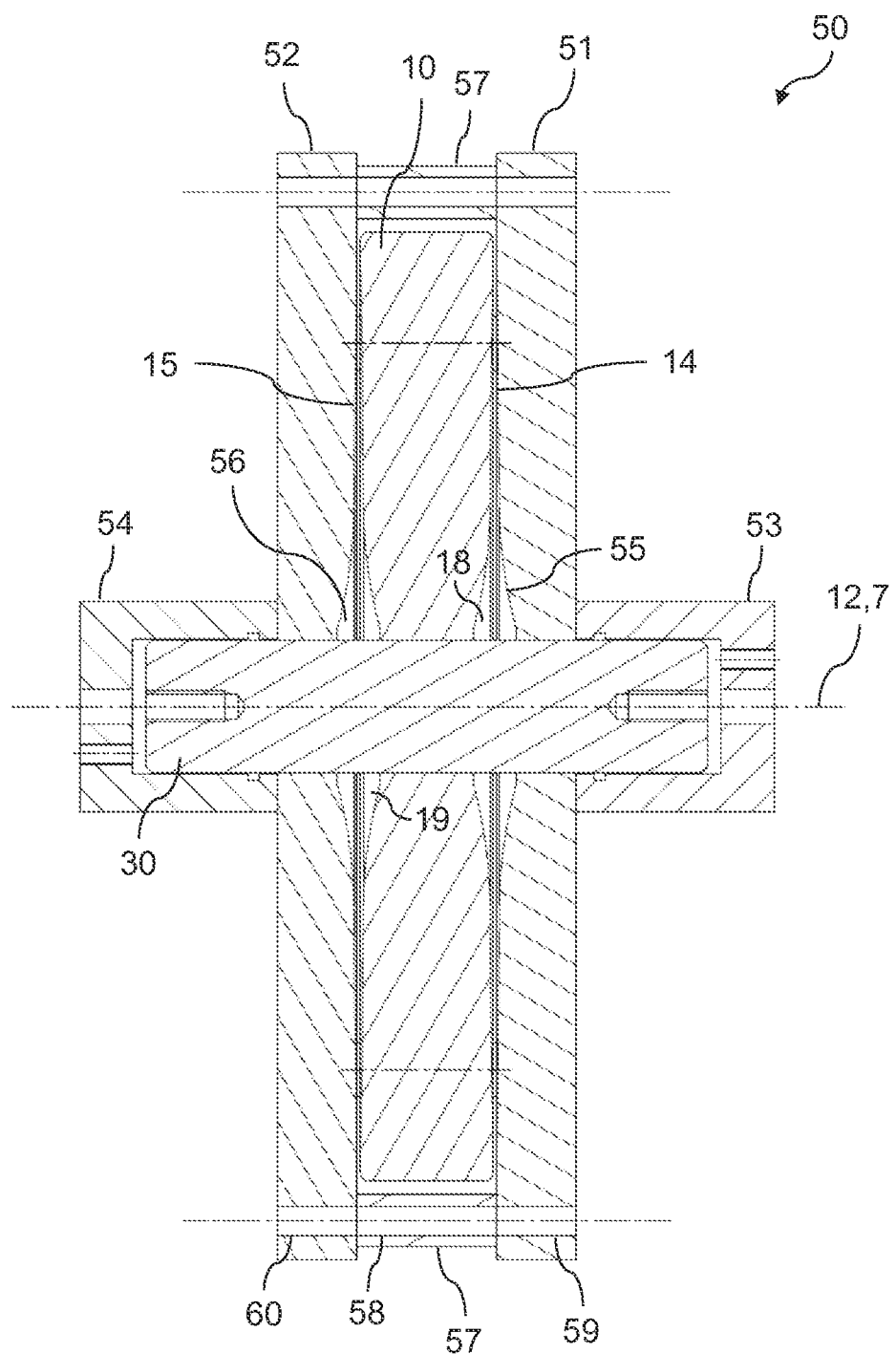

FIG. 1 shows a top view of a conventional chopper disc with a number of windows, FIG. 2 shows a cross-sectional representation of the chopper disc shown in FIG. 1, FIG. 3 shows a winding mandrel for the manufacture of a chopper disc according to the invention in a cross-sectional representation, FIG. 4 shows a top view of the winding mandrel shown in FIG. 2 and, for the sake of example, two carbon fiber sections guided over the winding mandrel, FIG. 5 shows a section through a pressing device according to the invention into which a winding mandrel with an endless carbon fiber wound around it has been introduced.

Figure 6:
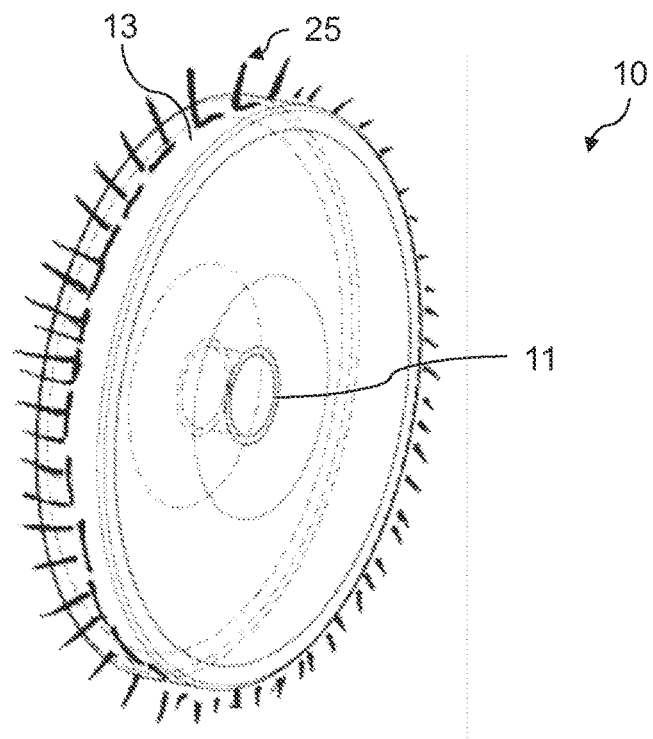
Figure 7:
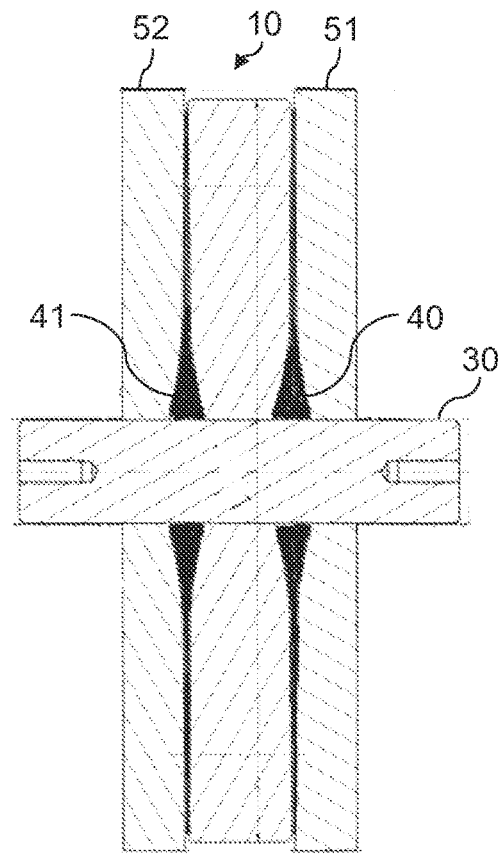
Figure 8:
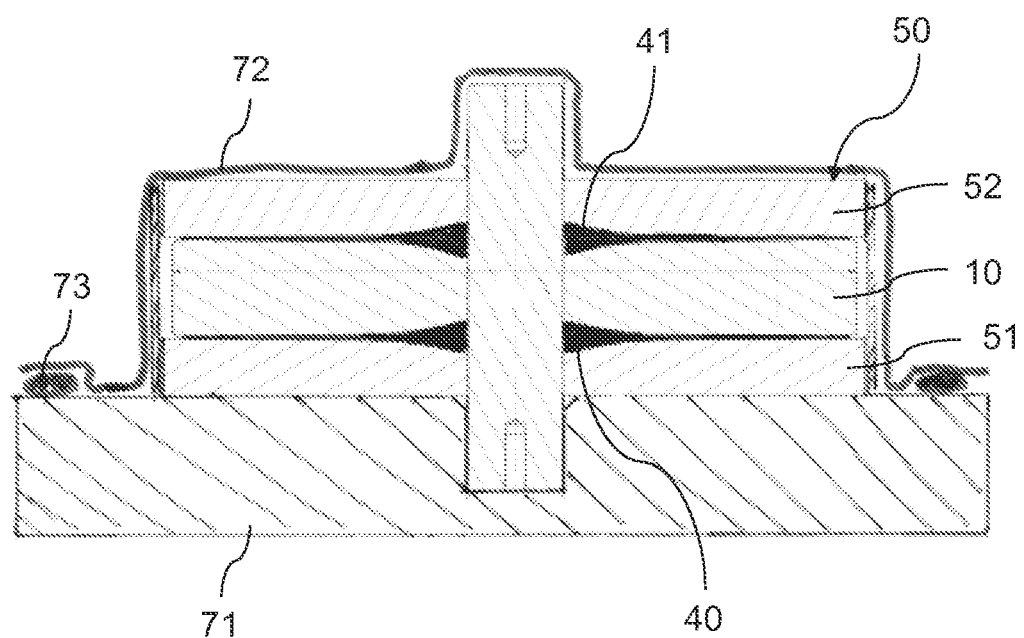

FIG. 6 shows a perspective view of a winding mandrel according to the invention with a needle crown arranged on its outer periphery, FIG. 7 shows another representation of the pressing device shown in FIG. 5, from which the produced structure of two chopper discs according to the invention can be seen, and FIG. 8 shows the pressing device introduced into an autoclave in order to cure the carbon fiber roving.

DETAILED DESCRIPTION

FIGS. 1 and 2 show a top view and a section along line A-A through a conventional chopper disc 1. The chopper disc 1 has a concentric, hollow cylindrical recess 2 for receiving a hub 3 for connection to a pivot bearing. The pivot bearing can be embodied as a magnetic bearing. The chopper disc 1 is manufactured from a plurality of prepared, trimmed fiber mats.

Typically, the chopper disc is composed of several packages of four fiber mat layers each. The carbon fibers of a respective fiber mat are aligned parallel to each other. The fiber mats of a package are rotated with respect to each other, so that the carbon fibers of a respective layer are arranged in rotated fashion at a predetermined angle with respect to the adjacent layer. After the plurality of fiber mats has been laminated together, trimming is performed, whereby the circular outer periphery 6 (circumference) of the chopper disc 1 is achieved.

An absorber area 4 is provided in a section arranged radially on the outside. The absorber area 4 is provided with a plurality of windows 5. The windows 5 are introduced into the absorber area 4 in the form of grooves, for example by milling or water jet cutting. The absorber area 4 is provided with an absorber material, e.g., boron, and is impermeable to neutrons.

During rotation at a predetermined rotational speed, generally greater than 20,000 revolutions per minute, in order to minimize the forces, which increase as distance from the axis of rotation 7 becomes greater, the thickness of the chopper disc 1 decreases as the distance from the axis of rotation 7 increases. The reduction of the thickness is achieved by means of a material-removing method, e.g., milling or reduction of the number of fiber layers, thus resulting in the concentric, discontinuous transitions (edges) designated by (FIG. 2). A weakening of the material thus occurs in this area, so that the maximum rotational speed of the chopper disc 1 is limited for this reason as well as due to the plurality of fibers, which contribute little or nothing to the strength depending on their angle to the centrifugal force. However, these fibers generate a load due to their weight, thus limiting the overall strength of the chopper disc 1.

In contrast, the manufacture of a chopper disc 1 according to the invention is not performed with the aid of prepared, trimmed fiber mats, but rather a winding process with the aid of a winding mandrel 10 depicted in FIGS. 3 and 4. The winding mandrel 10 has the structure of a disc or of a cylinder 9. i.e., its axial length 16 is substantially shorter than the radius 17 of the winding mandrel or cylinder 9. This can be seen from FIG. 3. The radius 17 of the winding mandrel 10 is slightly greater than the radius to be achieved of the chopper disc to be manufactured. If the radius of the chopper disc is to be between 25 cm and 40 cm, then the radius of the winding mandrel 10 is 2.5 cm to 5 cm greater, for example.

The winding mandrel 10 consists of the cylinder 9 and of a first and second dome top cap 14, 15, which constitute a first and second side surface of the winding mandrel 10. The dome top caps 14, 15 are connected to each other via an axially running circumferential surface 13 cylinder 9. Circumferential surface 13 and dome top caps 14, 15 can be integrally formed. Alternatively, they can also be connected to each other in a positive or nonpositive manner.

As can be seen clearly from the cross-sectional representation of FIG. 3, the dome top caps 14, 15 have concave indentations 18, 19, so that the winding mandrel 10 has a smaller axial length in the area of the axis of rotation 12 than in the area of the periphery. As will become clear from the following description, the concave indentations 18, 19 serve to receive the volume of the carbon fiber to be wound and to enable the smaller thickness of the chopper disc 1 as the distance from the axis of rotation 12 increases.

For the winding process, the winding mandrel 10 is additionally provided on its circumferential surface 13 with a needle crown 25 (cf. FIG. 6) or another slip-resistant surface. The needle crown 25 or the slip-resistant surface enable the winding of the winding mandrel 10 on both sides of the dome top caps 14, 15 beyond the circumferential surface 13 while ensuring that the carbon fiber 20 crossing the circumferential surface 13 does not slip laterally. The needle crown 25 or the slip-resistant surface of the circumferential surface 13 enable the use of an endless carbon fiber.

Merely for the sake of example, the profile of two carbon fiber sections is shown in the top view of the winding mandrel 10 in FIG. 4. Reference symbol 20 designates the endless carbon fiber. In a first winding pass, the profile of the carbon fiber 20, which is designated by the solid line, is achieved with the sections 21, 22, 23. In another winding pass (this need not necessarily be the next one, but can be the hundredth or five-hundredth subsequent winding pass, for example), the profile of the carbon fiber 20 designated by the broken line is achieved with the sections 21', 22', 23'. Outer angle 24 is shown between the first and the second sections 21, 22.

The carbon fiber section laid in the first winding pass consists of a first straight section 21 and a second straight section 22 as well as a bent middle section 23 lying therebetween. The straight sections 21, 22 extend from the outer periphery, i.e., the circumferential surface 13, of the winding mandrel 10 radially in the direction of the recess 11, in which a shaft 30 is arranged. The straight sections initially contact the recess 11 or the shaft 30 tangentially. At this point, the straight sections 21, 22 transition into the middle section 23, whose profile corresponds substantially to the edge or the periphery of the recess or shaft. The (external) angle enclosed between the first straight section and the second straight section 21, 22 is preferably between 180° and 225°.

After the straight section 22 has reached the outer periphery or circumferential surface 13, it extends in the axial direction of the axis of rotation 12 beyond the circumferential surface 13 and is wound accordingly in a manner as just described on the non-visible side of the winding mandrel 10. After a commensurate winding process has also been carried out on the non-visible back side of the winding mandrel 10, the carbon fiber is guided again in the axial direction over the circumferential surface 13 and the winding process is repeated on the illustrated dome top cap 14, which results, for example, in the profile of the carbon fiber designated by the broken line. The beginning of the first straight section 21' is offset at a predetermined angle 26 with respect to the section designated by the solid line 21. How large the angular offset between the successive carbon fiber sections on a dome top cap is can be determined using optimization calculations or experiments.

It can be seen from the described procedure that the needle crown 25 or the slip-resistant surface on the circumferential surface 13 serves to fix the section of the endless carbon fiber running over the circumferential surface in the axial direction.

The winding process is executed frequently in this way until a predetermined number of superposed layers of carbon fibers have been achieved. A number from 4 to 8 layers (in the axial direction over one another) is sufficient here.

In order to ensure that the middle section of the carbon fiber 20 guided around the shaft is guided in the direction of the winding mandrel 10, the shaft 30 (not shown in FIGS. 3 and 4) is preferably cone-shaped, so that the diameter of the shaft 30 expands away from the recess 11. This cannot be seen in the figures.

The feeding of the carbon fiber can be achieved by means of a carbon fiber feeding device that feeds a carbon fiber (C-fiber roving) saturated in the pass through the resin bath to the winding mandrel. The laying of the carbon fiber on the winding mandrel is done mechanically according to a predetermined deposition plan.

As can readily be seen, laminates are created for two chopper discs; that is, a chopper disc is created on each side of the dome top cap 14, 15. The fiber volume content is set and checked during placement on the basis of a strand weight. During laying of the carbon fiber, it is to be splayed radially from inside to outside. The carbon fiber is laid in a gap-free and uniformly covering manner. When all of the fiber layers have been laid, pressing is performed by means of the pressing device 50 shown schematically in FIG. 5. Pressing discs 51, 52 are applied to the shaft 30 from both sides of the winding mandrel 10 and maintained at a defined distance from one another by spacing sleeves 57. Via holes 58, 59, 60, the pressing discs 51, 52 can be connected each other at the outer periphery through the spacing sleeves 57. The pressing discs 51, 52 are braced by means of clamping sleeves 53, 54. These are guided over the shaft 30 and connected thereto in such a way that the pressing discs 51, 52 are impinged with force.

As can readily be seen from the cross-sectional representation of FIG. 5, both the first and the second pressing disc 51, 52 have a concave indentation 55, 56, which respectively correspond to the concave indentations 18, 19 of the winding mandrel. This ensures the symmetrical structure of the corresponding chopper discs 40, 41 (cf. FIG. 7).

If the carbon fibers were not already saturated with a resin system during the winding process, this can also be done before the pressing step or simultaneously with pressing.

During pressing, the laminated carbon fiber composite is severed along the periphery of the winding mandrel 10. The severing can be done by milling, cutting or water jet cutting, for example. During severing, the chopper discs 40, 41 whose shape has already been established are already braced slightly in the laminating device 50.

Next, curing is performed in the autoclave, which is shown for the sake of example in FIG. 8. The autoclave 70 comprises a bottom plate 71 as well as a cover 72. A circumferential seal 73 is arranged between these. In the autoclave 70, curing is performed according to a predetermined pressure, temperature and time profile. Upon completion of curing, demolding is performed, with both chopper discs 40, 41 then being tempered in the exposed state. The tempering is performed in a predefined manner according to a temporally predetermined temperature profile.

Subsequently, the edge and the edge cutouts (windows) are worked using a material-removing method. Water jet cutting can be used for this purpose, for example, whereby the outer contour of the chopper disc is established, that is, the radius of the chopper disc is established and the number and shape of the required windows are introduced into the absorber area. In addition, the absorber area is coated in a known manner with an absorber material, e.g., boron.

As a result, two chopper discs are made available in which all of the now individual carbon fibers have a nearly radial profile. Due to the method of manufacture, it turns out that the thickness of the chopper disc decreases continuously starting from the axis of rotation in the direction of the outer periphery. The chopper discs have a convex arch on each side. As a result, chopper discs having nearly the same strength are made available which have an optimized ratio of disc thickness to stress. Consequently, it is possible to use the chopper discs at higher rotational speeds.

Although the chopper discs are manufactured from a single, endless plastic fiber, upon completion of the manufacturing process, each of the chopper discs consists of many individual carbon threads which extend from the outer periphery of the chopper disc radially in the direction of the recess in order to receive the hub and contact the recess tangentially.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS 1 chopper disc
2 recess
3 hub
4 absorber area
5 window
6 outer periphery
7 axis of rotation
8 discontinuous transition (edge)
9 cylinder
10 winding mandrel
11 recess for receiving a shaft
12 axis of rotation
13 cylinder circumferential surface
14 dome top cap and first side surface of the winding mandrel
15 dome top cap and second side surface of the winding mandrel
16 axial length of the winding mandrel or cylinder
17 radius of the winding mandrel or cylinder
18 concave indentation
19 concave indentation
20 carbon fiber
21 first straight section of the carbon fiber 20
22 second straight section of the carbon fiber 20
23 bent middle section of the carbon fiber 20
21' first straight section of the carbon fiber 20
22' second straight section of the carbon fiber 20
23' bent middle section of the carbon fiber 20
24 (outer) angle between the first and the second section 21, 22
25 needle crown
26 angle
30 shaft
40 first chopper disc
41 second chopper disc
50 pressing device
51 first pressing disc
52 second pressing disc
53 first clamping sleeve
54 second clamping sleeve
55 concave indentation der first pressing disc 51
56 concave indentation der second pressing disc 52
57 spacing sleeve
58 hole
59 hole
60 hole
70 autoclave
71 bottom plate
72 cover
73 seal

What is claimed is:

1. A chopper disc for a device for the processing of neutron beams, the chopper disc comprising:
    a concentric, hollow cylindrical recess configured to receive a hub for connection to a pivot bearing;
    a concentric absorber area configured to absorb neutrons striking the chopper disc;
    at least one window in the concentric absorber area through which the neutrons of the neutron beam can pass; and
    a plurality of the carbon fibers extending continuously from an outer periphery of the chopper disc nearly radially in a direction of the concentric, hollow cylindrical recess, wherein the plurality of carbon fibers contact the concentric, hollow cylindrical recess tangentially, wherein each of the plurality of the carbon fibers terminates at the outer periphery;
    a further plurality of the carbon fibers extending continuously from the at least window of the chopper disc nearly radially in a direction of the concentric, hollow cylindrical recess, wherein the further plurality of carbon fibers contact the concentric, hollow cylindrical recess tangentially, wherein each of the further plurality of the carbon fibers terminates at the at least one window.

2. The chopper disc of claim 1, wherein at least a large portion of the plurality of carbon fibers extends from the outer periphery of the chopper disc nearly radially in the direction of the recess and contact the recess tangentially.

3. The chopper disc of claim 1, wherein all of the plurality of carbon fibers extend from the outer periphery of the chopper disc nearly radially in the direction of the recess and contact the recess tangentially.

4. The chopper disc of claim 1, wherein each first and second end of the plurality of carbon fibers ends at the outer periphery and a section running in a middle between the respective first and second end has a circular arc shape with a profile corresponding substantially to an edge of the recess.

5. The chopper disc of claim 1, wherein each of the plurality of carbon fibers has no, one, two, or more points of intersection with other of the plurality of carbon fibers.

6. The chopper disc of claim 1, wherein, in a cross-section on a plane on which an axis of rotation of the chopper disc lies, a thickness of the chopper disc decreases continuously starting from the axis of rotation in a direction of the outer periphery.

7. The chopper disc of claim 6, wherein the chopper disc has a convex arch in cross-section at least in sections on one side.

8. The chopper disc of claim 1, wherein the plurality of carbon fibers are embedded in a resin system or enclosed by the resin system.

9. The chopper disc of claim 1, wherein a diameter of the chopper disc is between 50 cm and 80 cm.

10. The chopper disc of claim 1, wherein a diameter of a hub is 50 mm to 100 mm.

11. The chopper disc of claim 1, wherein a fiber volume content of the chopper disc is between 50% and 70%.

12. The chopper disc of claim 1, as set forth in any one of the preceding claims, wherein the at least one window is arranged in a section bordering the outer periphery of the chopper disc.

13. The chopper disc of claim 1, wherein the outer periphery is continuous and formed by severed ends of the plurality of the carbon fibers that terminate at the outer periphery.

14. The chopper disc of claim 13, wherein an inner side of the at least one window is continuous and formed by severed ends of the further plurality of the carbon fibers terminating at the at least one window.

* * * * *